(12) United States Patent
Jablonsky

(10) Patent No.: US 7,222,585 B2
(45) Date of Patent: May 29, 2007

(54) AQUACULTURE PROCESS AND APPARATUS

(76) Inventor: Viktor Jablonsky, 6 Scott Avenue, St. Albans, Victoria (AU) 3021

( * ) Notice: Subject to any disclaimer, the term of this patent is extended or adjusted under 35 U.S.C. 154(b) by 75 days.

(21) Appl. No.: 10/491,198

(22) PCT Filed: Sep. 26, 2001

(86) PCT No.: PCT/AU01/01205

§ 371 (c)(1),
(2), (4) Date: Apr. 26, 2004

(87) PCT Pub. No.: WO03/026406

PCT Pub. Date: Apr. 3, 2003

(65) Prior Publication Data

US 2004/0211367 A1    Oct. 28, 2004

(51) Int. Cl.
*A01K 61/00*    (2006.01)
*A01K 63/00*    (2006.01)
(52) U.S. Cl. ..................... 119/211; 119/227
(58) Field of Classification Search ............... 119/200, 119/201, 203, 204–211, 213–215, 217, 218, 119/226, 227, 234, 236
See application file for complete search history.

(56) References Cited

U.S. PATENT DOCUMENTS

| 4,205,625 | A |   | 6/1980  | Muller-Fuega |
|-----------|---|---|---------|--------------|
| 4,279,218 | A |   | 7/1981  | Brinkworth |
| 4,337,727 | A |   | 7/1982  | Mickelsen et al. |
| 4,382,423 | A | * | 5/1983  | Dugan et al. ............... 119/211 |
| 5,353,745 | A | * | 10/1994 | Fahs, II ..................... 119/226 |
| 6,585,888 | B2 | * | 7/2003  | Axelrod ..................... 210/169 |

FOREIGN PATENT DOCUMENTS

AU    78917/87    3/1988

OTHER PUBLICATIONS 91-027739/04, Nov. 26, 1990, Gellert.

* cited by examiner

*Primary Examiner*—T. Nguyen
(74) *Attorney, Agent, or Firm*—Cohen Pontani Lieberman & Pavane LLP

(57) ABSTRACT

A method suitable for commercial aquaculture, the method comprising the steps of: (a) at least partially filling a tank (3) with an aqueous medium (13), the tank (3) being adapted for control of the quality of the aqueous medium (13), (b) locating one or more supports (2, 4) in the tank (3), each support (2, 4) being adapted to vertically hold multiple cells (1) containing marine or fresh water organisms, (c) removing one or more supports (2, 4) from the tank (3) to harvest the marine or fresh water organisms wherein a cell (1) is a self-contained unit including a barrier such as a wall to enclose marine or fresh water organisms in a volume of aqueous medium (13) and includes one or more apertures or interstices to facilitate free flow of the aqueous medium (13) between the interior and exterior of the cell (1). Each cell (1) further includes a port for insertion of the marine or fresh water organisms, the port being blocked or restricted when the cell (1) is held by the support (2, 4).

12 Claims, 5 Drawing Sheets

AQUACULTURE PROCESS AND APPARATUS

This is a U.S. national stage of application No. PCT/AU01/01205, filed on 26 Sep. 2001.

FIELD OF THE INVENTION

This invention relates to an improved aquaculture process and apparatus for use with the process. In particular the present invention relates to an improvement in the current process for the commercial cultivation of freshwater or marine organisms, including purging, harvest or simple storage of the organisms.

BACKGROUND OF THE INVENTION

In this specification, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

While the present invention will be described with reference to the production of crayfish, such as yabbies in Australia, the invention is not geographically limited and extends to production of other freshwater or marine organisms including crustacea, exotic fish, shell fish and corals.

Although there is a large commercial market for crayfish in Australia the crayfish aquaculture industry suffers from problems such as inconsistency of catch size and variable yield from one harvest to the next. This in turn means that financial returns to producers are inconsistent and variable.

Despite this, Australia is one of the world's highest producers of yabbies (*Cherax destructor* and associated species). Primarily these yabbies are produced throughout the southern areas of Australia where the weather conditions suit the yabby very well. However, traditional commercial yabby farming techniques have the disadvantage of propagation of the yabbies. Furthermore, the correct soil type is required to hold the necessary water volumes and the dams must be located within certain geographical areas to facilitate convenient distribution of the yabbies produced.

Yabbies are relatively hardy creatures which proliferate in what the casual observer would consider to be murky, turbid waterways and are generally consistent, self maintaining breeders. However they can be affected by stress. Unfavourable environmental conditions such as overcrowding, limited feed, unfavourable weather conditions and poor water quality can cause stress levels to rise to a point where the yabbies die. This has a severe impact on the harvest yield. Mortality rates of up to 95% of juvenile yabbies, are typical in traditional farming techniques. Juveniles that do survive, and grow to minimum table size of at least 35 grams are often damaged during harvesting, usually when their claws or legs are broken. This further reduces the proportion of marketable yabbies in the harvest.

Harvest yield is also affected by pilfering. Because traditional yabby farming uses large dams which are located in relatively isolated parts of farm paddocks it is difficult to stop birds, eels and fish from preying on the developing yabbies. It is also not uncommon for looters to drag a net through a dam and steal the developing yabbies.

In an effort to increase yabby production, efforts have been made to commercially produce yabbies in large containers that mimic dams. While these large containers can be located at a wider and more convenient range of locations, the problems of avoiding stress must still be addressed. The yabbies in these large containers are stored in a series of rectangular wire cages packed one on top of the other. Accordingly refuse and uneaten food, from the uppermost cages sinks downwards such that the yabbies in the lower cages suffer stress and a high mortality rate.

It has now been found that many of the problems associated with traditional farming techniques can be alleviated, thus providing improved market yields.

SUMMARY OF THE INVENTION

The present invention therefore provides a method suitable for commercial aquaculture, the method comprising the steps of;

(a) at least partially filling a tank with an aqueous media, the tank being adapted for control of the quality of the aqueous media, (b) locating one or more supports in the tank, each support being adapted to vertically hold multiple cells for the confinement of marine or freshwater organisms, and (c) removing one or more supports from the tank to harvest the marine or freshwater organisms Where used herein, each cell is a self-contained unit which includes a barrier such as a wall to enclose marine or freshwater organisms in a volume of aqueous media, and includes one or more apertures or interstices to facilitate free flow of aqueous media between the interior and exterior of the cell. Each cell further includes a port for insertion or removal of the marine or freshwater organism. In use, when the cell is held by the support, the port is necessarily blocked or restricted to prevent escape of the marine or freshwater organism from the cell.

Preferably, each cell comprises a solid wall having multiple apertures of maximum width less than 2 mm. Alternatively, each cell may comprises a wall of mesh material having interstices of maximum width less than 2 mm.

Preferably the cells for containment of marine or freshwater organisms are plastic or polymeric bottles, such as those made from polyethylene terphthalate (PET) including one or more perforations. Alternatively, the cells may comprise woven polymeric or other material, the interstices being defined by warp and weft members of the weave.

The cells may be held on the support by any convenient means. Typically each cell has a port defined by a neck, the exterior surface of which includes a screw thread, bayonet fitting or the like. The support may have corresponding fittings to which the cell necks may be attached and thus held.

Using this method, a large number of cells can be distributed in three dimensions throughout the aqueous media in the tank, thus supporting high densities of freshwater or marine organisms.

The method can be used for storing, cultivating, and/or purging marine or freshwater organisms prior to harvest. For example the method may be used to purge or store yabbies caught from dams or watercourses. Alternatively the method maybe used to cultivate or grow the yabbies from juvenile size (at least 4 grams) up to 300 grams, although the market will accept yabbies greater than 35 grams.

The present invention further provides an apparatus for use with the process of the present invention, the apparatus comprising;

(a) a tank containing a aqueous media, the tank being adapted for control of the quality of the aqueous media, and (b) cells adapted for the confinement of marine or freshwater organisms, and (c) one or more supports which can be located in aqueous media in the tank, each support adapted to vertically hold multiple cells.

Typically the supports are posts which may be hooked onto guide rails that traverse the top of the tank. The supports may then be hung next to each other such that the cells are layered or stacked underwater in three dimensions. Alternatively, or additionally, the supports may have floats attached.

In the past, traditional yabby farming techniques have supported 5 to 25 yabbies per $m^2$ which are harvested once a year. By contrast the method of the present invention supports up to 1,500 yabbies per $m^2$ (or 75 kg $m^2$) which can be harvested twice per year.

The tank for use with the method and apparatus of the present invention is preferably a plastic or polymeric tank of the type commonly used for aquaculture. Typically smaller aquaculture tanks are up to 3000 liters, have tapered walls and are of cylindrical cross section. Larger volume tanks are usually of rectangular cross section, measuring up to 11.5 meters in length and 3.6 meters in width with a depth of 0.9 to 1.5 metres.

Typically the aqueous media is fresh water or artificial or naturally derived salt water. The aqueous media may include additives such as nutrients to feed the marine or freshwater organisms. In general additives such as water purifying chemicals are not necessary if an appropriate filter is used to control water quality.

Apart from the marine or freshwater organisms located in the cells, the aqueous media may additionally include live organisms. For example black comet fish (goldfish variation) or sucker fish, may be used to supplement the control of quality of the aqueous media, and to clean the exterior of the cells. Live fish also act as good dissolved oxygen (DO) meters of the aqueous media, giving a very good indication of the DO levels if they live in the tank. Yabbies prefer to live in aqueous media having at least 4 ppm DO or roughly 40% saturation. The fish can also perform a special function, acting as a threatening agent to the marine or freshwater organisms in the cells, reducing their complacency and ensuring they remain stimulate and thus rendering healthy produce.

Typically the quality of the aqueous media is controlled by adjusting the temperature, or by filtering. Use of temperature control allows the aqueous media to be maintained at the optimal temperature for propagation or storage of the relevant marine or freshwater organism. For example, the optimal temperature for yabby propagation is 22° C. The temperature control may be provided by the use of submersible heaters operating on timers. An alternative, or additional source of heat can be provided by compost packed around the tank because the decomposition of compost is exothermic/biothermic. The compost can also support worms or other living creatures, which may be used as food for the marine or freshwater organisms in the cells. Thus ecologically sound practices such as vermiculture can be combined with the method of the present invention.

Filtering can control quality of the aqueous media by removing particulate material such as excreta, or undesirable microorganisms such as bacteria. Maintaining turbidity in the aqueous media can be advantageous for propagation or storage of some organisms because if they cannot see each other, they have less tendency to fight and damage each other. However, prior to harvest, many marine or freshwater organisms must be cleaned and purged to make them suitable for the market, and the filtration may be adjusted to achieve this.

Typically the filtration is carried out using a bio-filter. In a particularly preferred process of filtration, the aqueous media to be filtered is mechanically pumped through a disk particle filter to remove large particulate solids and then over a layered arrangement of live bacteria, natural shell material, zeolite and charcoal. Bacteria utilize the micro fissures between the layers of calcium in the oyster shells to multiply and create vast colonies of bacteria. Suitable bacteria for use in existing biological filters, are commercially available. Natural shell material such as marine or freshwater mollusc shells are relatively thin and plate-like hence their surface area is enormous. Mollusc shells have the additional advantage that they impart calcium ions and other useful material to the aqueous media. Toxins such as ammonia and nitrites may be kept in check by the colonies of bacteria. These bacteria purify the aqueous media by consuming the toxins produced by the marine and freshwater organisms in the tank, creating non-toxic by products. For example, the ammonia and nitrites are converted to nitrates which can be leached out of the bio-filter. As natural shells in the bio-filter are often microporous and produce numerous cavities, water flowing through the shells is highly enriched with oxygen and is further neutralized by the calcium and zeolite.

The water is then further cleaned by being forced to flow through another disk filter such as a carbon filter, under pressure. Typically water flowing back into the tank will be clean, that is devoid of any turbidity, algal spores or toxins.

Where the tank is surrounded by compost, the nitrate leached out by the bio-filter may be supplied to the compost, thus supplying an important nutrient to the compost, supporting the cultivation of any living species that live on the compost. The nitrates could also be supplied to any horticulture carried on near or in association with the aquaculture.

The appropriate pH level of the aqueous media will depend on the freshwater or marine organism being kept in the tank. For example most yabbies prefer alkaline water (pH 7.5 to 10) although some rarer species prefer acidic water (pH less than 7). The tank may include a control device for measuring and adjusting pH by addition of small quantities of alkaline or acidic material as appropriate. The micro-biological activity within the filter is one of the factors that can cause fluctuations in pH.

Preferably the tank includes a device for controlling feeding of the marine or freshwater organisms as they are grown from juvenile size to harvest size. For example, very young yabbies intended to be cultivated according to the method of the present invention may, initially be put in cells, each cell being provided with a starter block. Starter blocks consist primarily of algae, bark, animal protein, starch and leather. Depending on the species, various additives may also be required in the starter block. Apart from acting as a source of food, starter blocks also assist in creating a viable micro-biological environment inside the strata cell, allowing the contents of the strata cell to graze on algae and detritus that build up in the cell. As the juvenile yabbies develop, they should be provided with a high protein feed once per week in order to promote their full growth potential.

In a preferred embodiment, for tanks holding less than 1500 yabbies, the feeder may consist of a shallow tub adapted to receive a cell support so that it can be moved laterally and vertically to a distance of 15 cms from the centre of the tub, in any direction. During the actual feeding process, food particles are added to the shallow tub and air is bubbled into the tub to cause the feed to move about chaotically. The cells on the support post adjacent the shallow tub include perforations so that the food particles can readily enter the cells. The quantity of food particles entering the cells can be modified by varying the water/food ratio, or varying the length of time the support is located in the tub.

In another preferred embodiment, for larger systems and automated industrial systems using tanks holding more than 1100 yabbies the feeder directly delivers feed into each cell by through a small perforation at the center of the base of each cell. By use of a manifold and pneumatic system, a viscous feed is moved under pressure from a stirrer pot via a supply line through the perforation in the cell to the interior of the cell. Feed dosages can be varied by regulating the feed flow rate through the supply lines or varying the pressure supplied to the stirrer pot. A cell support is manually floated into a position where it can be aligned with the feeding apparatus by use of a submerged plate connected to the feeder. This guide aligns the cell support and ensures that connectors on the end of the supply lines can be docked with the perforations in the cells. The system can be automated so that the cells on the support are automatically lined up and docked with the feeder for a pre-determined amount of time before the supports are returned to their normal resting position.

If the cells used for yabby propagation have a volume of 500 mls, the average harvest weight per cell is typically between 45 and 55 grams. If the cell volume is increased to 2000 mls the average yabby harvest weight per cell is typically 150 to 300 g.

Some marine or freshwater organisms require purging prior to harvesting. For example, in terms of traditional farming techniques, purging a yabby means doing two things;

(a) cleaning the yabby shell of algae and fungus, usually by immersing the yabby in a weak salt solution for a day or so; and (b) cleansing the intestinal tract or 'gut' by placing the yabby in clean fresh aerated water for two days (using separate holding tanks).

However these techniques can either kill weak yabbies or damage them so they are unsuitable for marketing, thus reducing the harvest yield.

The process of the present invention can avoid these problems. For example, with respect to yabbies cultivated in the apparatus of the present invention, the need for purging is minimal. The water quality maintained during the growth cycle of the yabby can prevent algae build upon the yabby shells. Clean, clear water for example, not only prevents algae build up, but causes spectacular shell colouring and patterning, particularly on yabby species *Cherax destructor* and *Cherax albidus*. Cleaning and purging per se are not required because the yabbies shells are kept clean and intestinal tract cleansing is attained by not feeding the yabbies for a couple of days prior to harvesting.

With respect to yabbies taken from wild populations, purging is relatively straightforward using the method and apparatus of the present invention. Each wild yabby is placed in a cell in the apparatus of the present invention where they stay for a period of between two days (when purging the gut tract only) or up to six weeks if every yabby is to mould at least once to discard its old dirty shell. On average 5% of yabbies in the system would mould on any given day. The result is clean, shelled yabbies ready for harvest and sale.

The process of the present invention further provides for quick and cost efficient harvesting of the marine or freshwater organisms. For example, traditional yabby farming techniques require netting the yabbies in the dam, manually sorting according to size and quality, discarding yabbies of unacceptable quality and purging the yabbies destined for market. By contrast, in the process of the present invention, most of these steps are not necessary because the yabbies are kept in individual cells in the tank and removal of each high quality, pre-purged and sorted cell is quick, easy and efficient.

Harvesting may includes the step of transferring the marine or freshwater organism to a storage means. Typically the storage means can be readily coupled or uncoupled to and from a port in the cell.

For example, if the organism is a yabby, the storage means may comprises a tube. Once the tube is coupled to the port of the cell, the yabby will take about 30 seconds to crawl into it from the cell.

The tube is then removed from the cell and the ends are pinched closed, and the yabby is ready for refrigerated holding or transport. Typically the tube is made of paper and provided with ventilation holes. For example, paper tubes used as storage means can be made from a single sheet of A4 paper that is at least 80 gm in weight. The contents of the storage means will remain viable for over 7 days if kept at or near 5° C. Yabbies are adapted to spending a large part of their life in a hole in the bank of a dam, hence they are not perturbed by being stored in this fashion and will not fight to escape. Furthermore, storage or transport at low temperatures will cause their metabolic rate to reduce to a level where they are virtually in suspended animation.

The paper tubes containing yabbies can be efficiently packed in boxes and when unpacked, they will be in the same good condition as when they were packed. This is in contrast to the packing method of the prior art which relied on yabbies being packed, unrestrained in a box containing straw, resulting in damage to a large proportion of the packed yabbies.

The apparatus of the present invention can be located indoors, allowing total control over the temperature and humidity, lighting, water quality and even security. The apparatus can be made sufficiently compact that the process can be carried out at very convenient locations such as points of sale, including markets or restaurants, or convenient points of despatch such as railway stations or ports.

The invention will now be described with reference to the following non-limiting drawings in which;

FIG. 1 shows an apparatus of the present invention designed for relatively small scale cultivation of up to 1100 yabbies;

FIG. 1*a* depicting a plan, side view of the apparatus and

FIG. 1*b* depicting a top view of the apparatus;

Figure 6A:
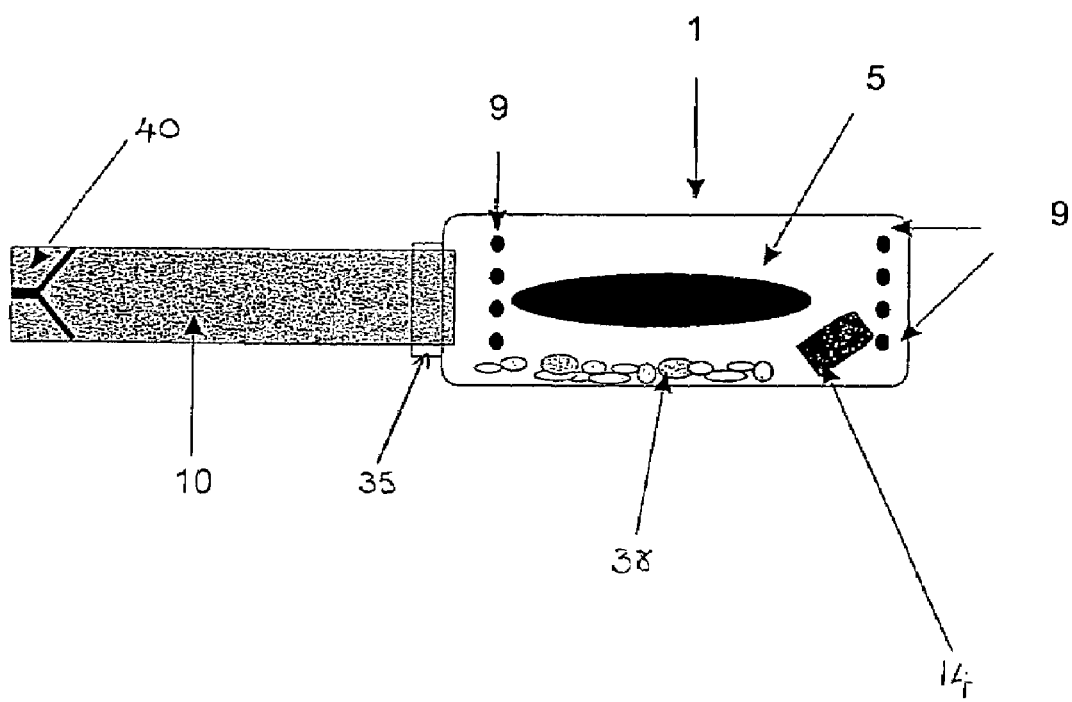
Figure 6B:
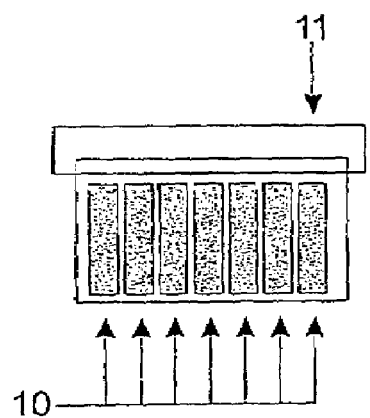

FIG. 6*a* depicts a cell attached to a storage means and FIG. 6*b* is a plan view of storage means packed in a box for transport.

Figure 1B:
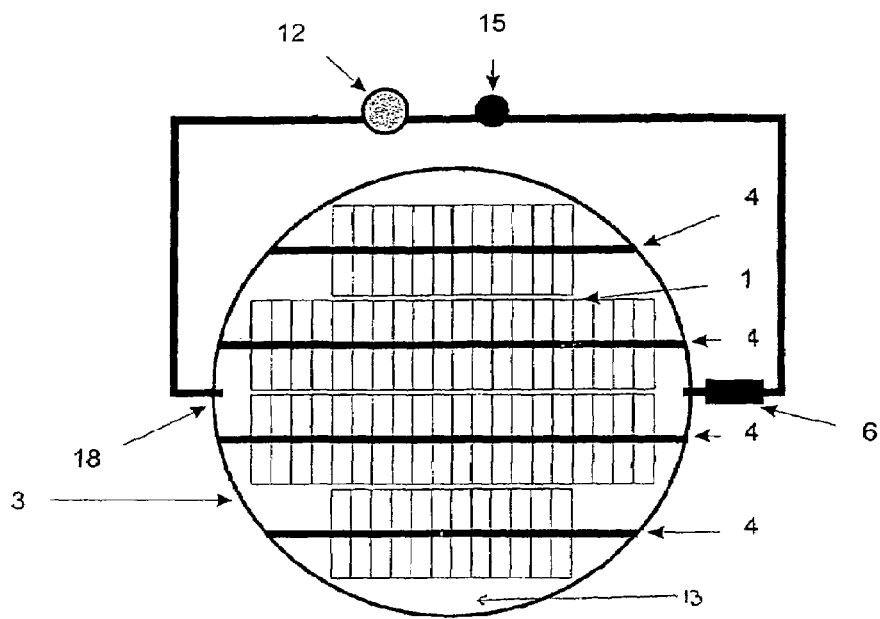
Figure 1A:
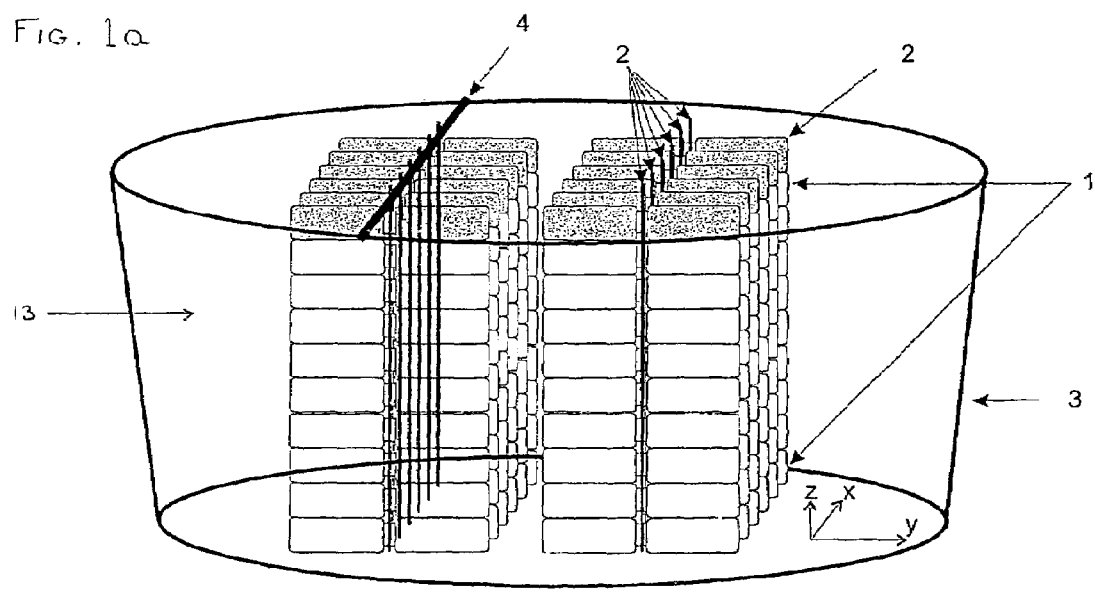

FIG. 1*a* clearly depicts a single 3000 liter volume tapered aquaculture tank (3) containing cells (1), vertically located on supports in the form of posts (2), the posts hanging on four supporting rods (4) suspended across the tank. In this manner, the cells are distributed in three dimensions, that is, in the x, y and z directions throughout the tank. The tank is filled with highly oxygenated water (13). Each post (2) has 2 floats (17) attached opposite each other to maintain buoyancy.

FIG. 1b clearly shows how the tank is connected by a 25 mm diameter pressure hose to a pump (6) that pumps fouled water out of the tank and through the filters (12,15) which maintain the water integrity. The water is then pumped back into the tank through a pressure reducing and aeration inlet nozzle (18). Suspended across the tank are a series of rods (4) which support the posts (2) which in turn vertically hold multiple cells (1) containing marine or freshwater organisms. This embodiment of the method and process of the present invention is particularly useful for raising crayfish such a yabbies, or exotic ornamental fish. System maintenance consists of washing the disk filter (15) once per week by rinsing under water, checking water pH levels and temperature daily and cleaning the filter (12) every six months.

Figure 2:
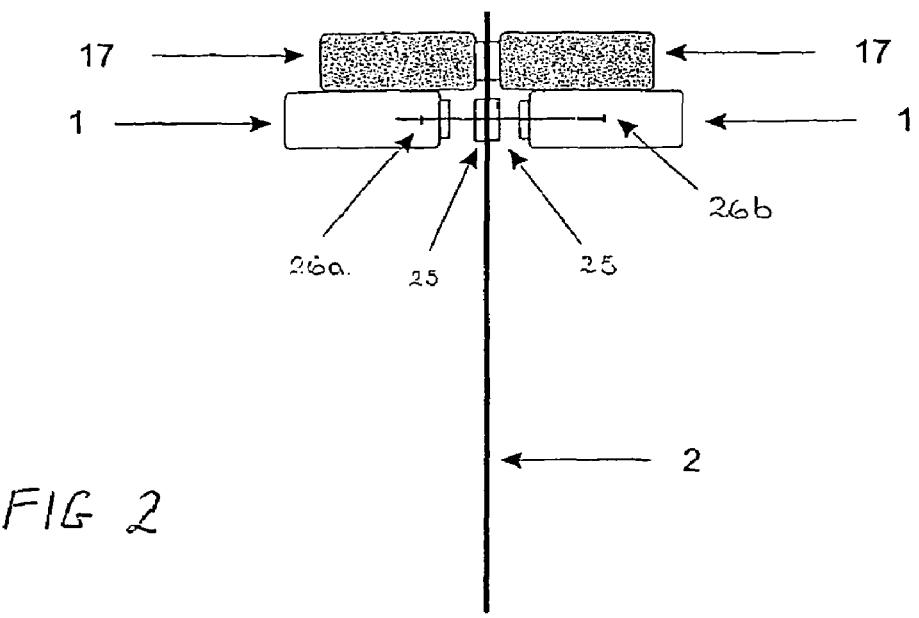
FIG. 2 depicts a pair of cells attached to a support in the form of a post.

FIG. 2 shows how each pair of cells may be vertically attached to a post. The post (2) is supported in the aqueous media by floats (17) attached to the upper end. The cells (1) can be attached to their respective lids (25) by a nut and bolt combination (26a,26b).

Figure 3:
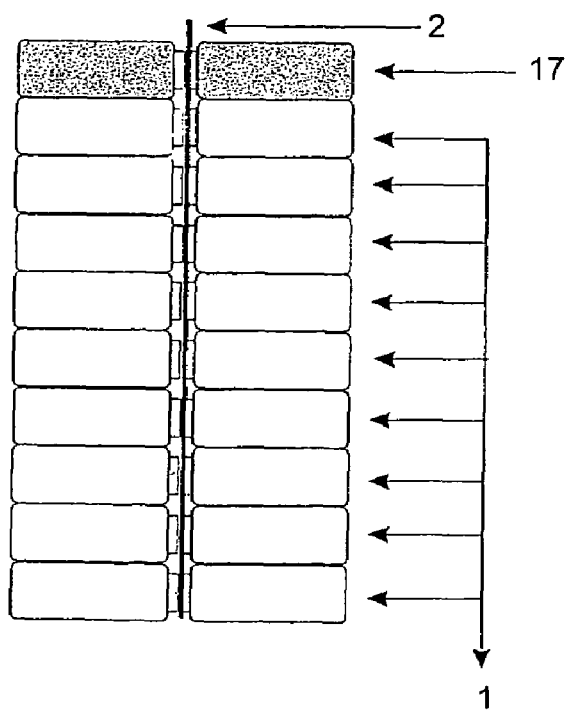
FIG. 3 depicts a support holding 18 cells.

FIG. 3 depicts multiple cells (1) attached to a post (2) supported at its upper end by floats (17).

Figure 4:
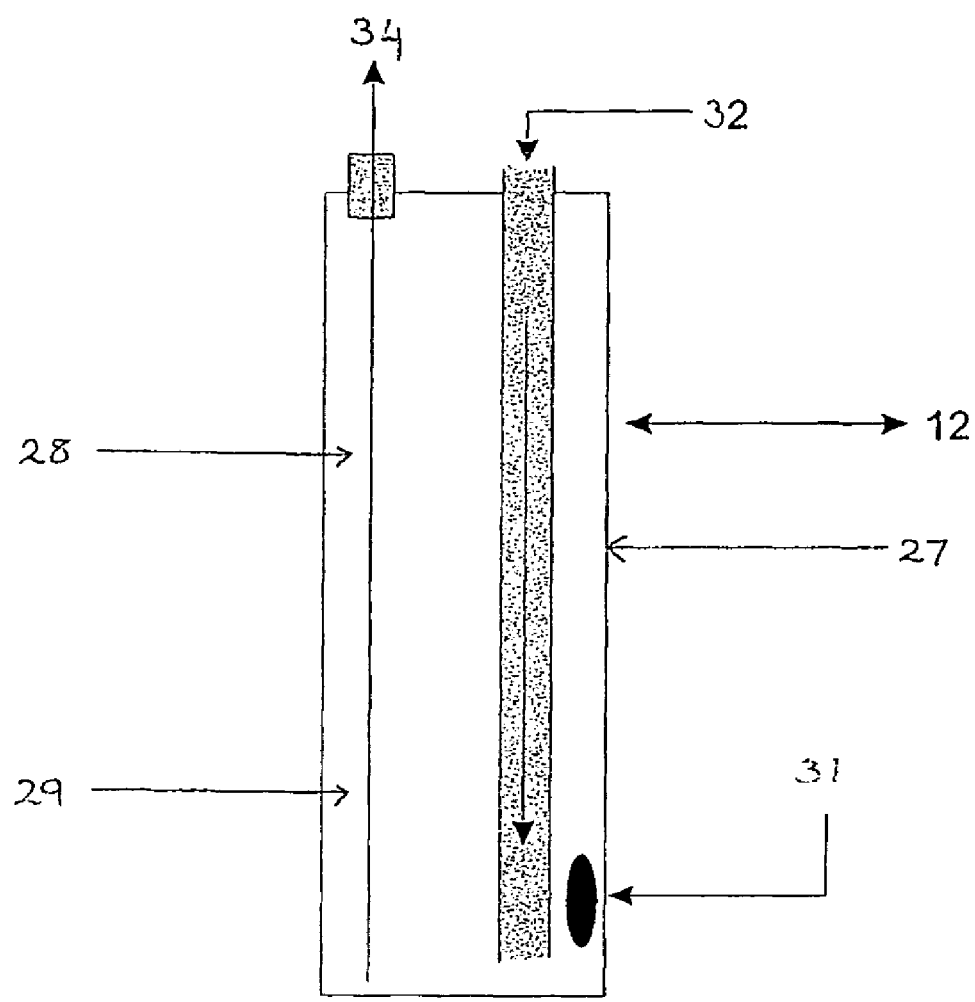
FIG. 4 depicts a bio filter for use with the apparatus of the present invention.

FIG. 4 depicts one embodiment of a bio-filter (12) suitable for using with the apparatus and method of the present invention. The filter includes a container (27), the upper half (28) of which is filled with zeolite, the lower half (29) being filled with oyster shells. A biological bacteria starter sachet (31) is initially located in the lower half of the container, to establish colonies of bacteria amongst the oyster shells. In use, fouled water enters the container along a column (32), firstly contacting the oyster shells and their colonies of bacteria before moving upwards through the zeolite until it flows through a discharge port (34). At the point of discharge, the water is biologically clean, and is passed through a charcoal scrubber before returning to the tank.

Figure 5:
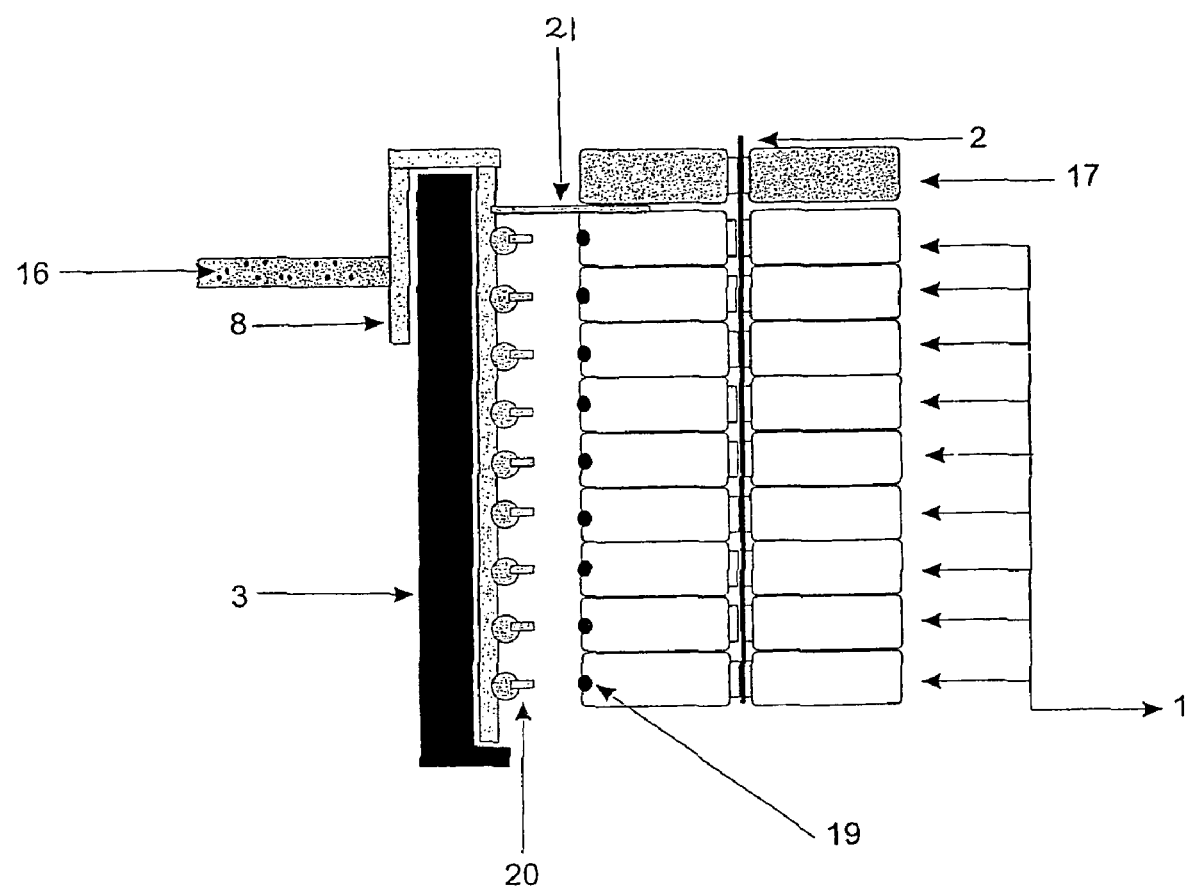
FIG. 5 shows one embodiment of a feeder for use with the apparatus of the present invention.

FIG. 5 depicts an embodiment of a feeder for use with the apparatus of the present invention when used for storing large numbers of marine or freshwater organisms. In this embodiment feed (16) from a stirrer pot is blown into the cells (1) on a stream of air passing through a single feed hole (19) located at the centre bottom of each cell (1). The feed (16) is injected into the cell through feed nipples (20) on the feeder. The feed nipples (20) are guided into the coupling position onto the strata cell (1) by virtue of a guide rail (21).

FIG. 6a depicts a cell attached to a storage means and FIG. 6b is a plan view of storage means packed in a box for transport. In this embodiment the storage means comprises a paper transport tube (10), that is, a single sheet of A4 paper rolled up to form a cylinder of small enough diameter that it can be inserted into the port (35) in the cell (1) which contains a yabby (5), a starter block (14) to feed the yabby and gravel (38) to increase the surface area for biological activity. The transport tube (10) is perforated through the centre of gravity by at least two holes of minimal diameter, and is pinched closed at one end (40). Once the transport tube (10) is connected to the cell (1), the yabby (5) will usually take about 30 seconds to crawl into the dark transport tube (10). After the yabby (5) has entered the transport tube (10) it is uncoupled from the cell and the open end is pinched closed.

FIG. 6b shows the filled transport tubes (10) packed into a foam watertight box (11), the yabbies orientated with their claws pointing upwards. The packed box is thus ready for refrigerated transport or sale.

The word 'comprising' and forms of the word 'comprising' as used in this description and the claims does not limit the invention claimed to exclude any variants or additions.

Modifications and improvements to the invention will be readily apparent to those skilled in the art. Such modifications and improvements are intended to be within the scope of this invention.

What is claimed is:

1. An apparatus for use in commercial cultivation of aquatic organisms, the apparatus comprising:
    (a) a tank, with a bottom, containing an aqueous media, the tank being adapted for control of the quality of the aqueous media;
    (b) one or more support elements in the tank, which extend in a substantially perpendicular direction to the bottom of the tank, wherein each support element is adapted to hold a plurality of cells; and
    (c) a plurality of cells, each cell comprising:
        a self-contained unit with a single interior region, lacking any dividing element(s) therein, and adapted for receiving a marine or freshwater organism to be grown therein in a volume of aqueous media,
        a perforated wall to facilitate free flow of aqueous media between the interior and exterior of the cell, and
        a port for insertion or removal of the marine or freshwater organism; and
    said port being attachable to said support so that said cell can be individually removed from said support, and when said port is attached to the support element, the support element blocks the port so as to contain the marine or freshwater organism within said cell.

2. An apparatus according to claim 1 wherein each cell comprises a solid wall having multiple perforations of maximum width less than 2 mm.

3. An apparatus according to claim 1 wherein each cell has a port defined by a neck and each of said one or more support elements includes corresponding fittings to which the cell necks may be attached.

4. An apparatus according to claim 1 wherein said one or more support elements are posts which are hooked onto holding means that traverse the top of the tank.

5. An apparatus according to claim 1 wherein the tank is adapted to control the quality of the aqueous media by connection to a temperature control means.

6. An apparatus according to claim 5 wherein the temperature control means consists of compost packed around the tank.

7. An apparatus according to claim 6 wherein the compost supports living creatures suitable for feeding to the marine or freshwater organisms in the cells.

8. An apparatus according to claim 1 wherein the tank is adapted to control the quality of the aqueous media by connection to a filter.

9. An apparatus according to claim 8 wherein said filter is a bio-filter comprising live bacteria, natural shell material, zeolite and charcoal.

10. An apparatus according to claim 1 which further comprises a feeder adapted to directly deliver feed into each cell.

11. An apparatus according to claim 10 wherein the feeder includes a pneumatic system for moving feed under pressure through one or more supply lines into the interior of one or more of the cells.

12. An apparatus according to claim 1, further comprising a filter housing, enclosing live bacteria, natural shell material and zeolite wherein aqueous media pumped into the filter first contacts the bacteria colonized on the natural shell material before passing through the zeolite prior to exiting the housing.

* * * * *